May 3, 1927.
B. F. KELLY
1,626,938
REAR VIEW MIRROR SUPPORT
Filed Dec. 21, 1925
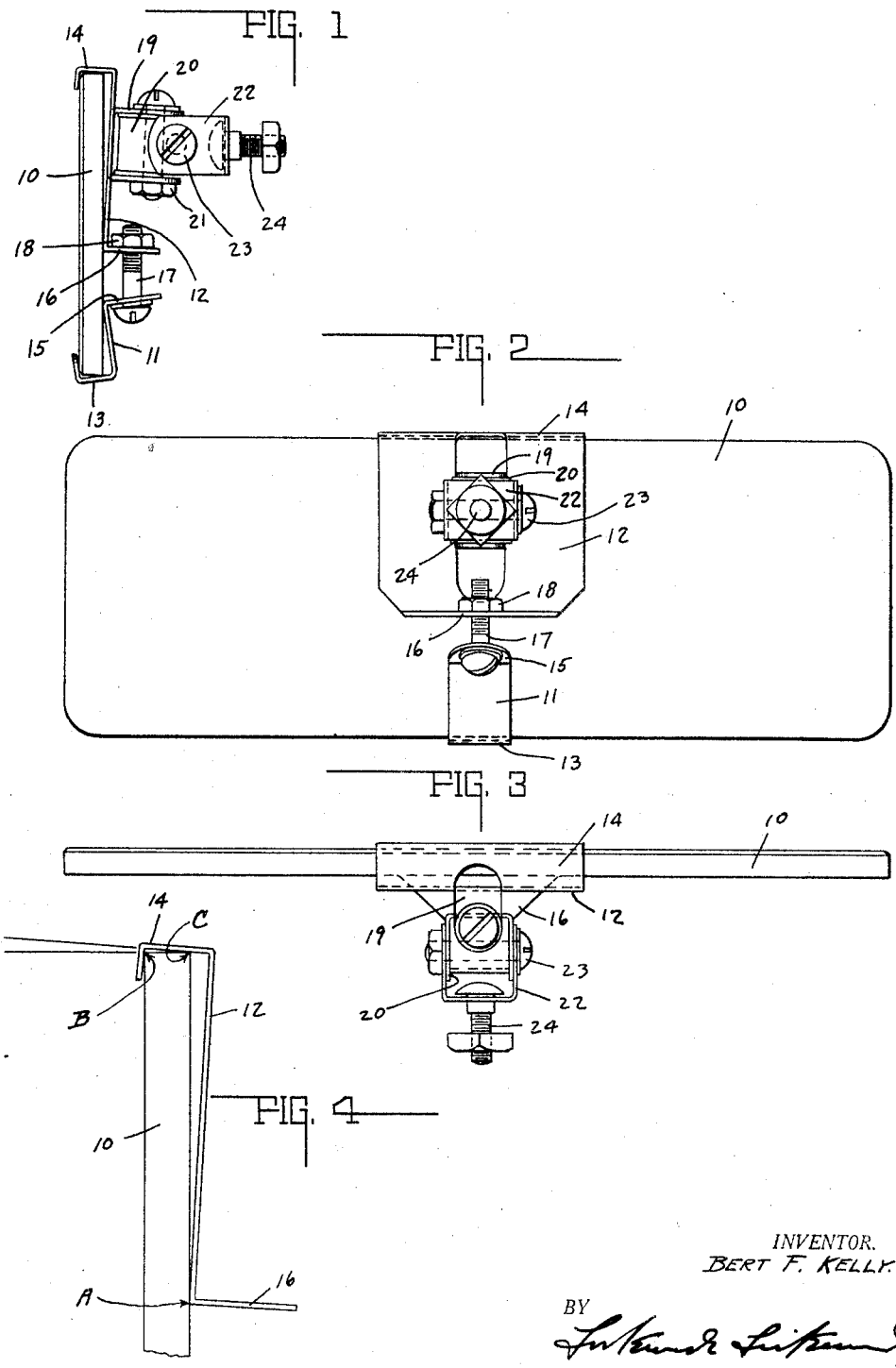
INVENTOR.
BERT F. KELLY.
BY
ATTORNEYS.

Patented May 3, 1927.

1,626,938

UNITED STATES PATENT OFFICE.

BERT F. KELLY, OF INDIANAPOLIS, INDIANA, ASSIGNOR TO PARTS CORPORATION, OF INDIANAPOLIS, INDIANA, A CORPORATION.

REAR-VIEW-MIRROR SUPPORT.

Application filed December 21, 1925. Serial No. 76,720.

This invention pertains to the bracket mounting for rear view mirrors, the type generally employed in connection with vehicles.

The principal feature of the invention resides in the arrangement of the clamps and clamping plates for securing the mirror glass rigidly in position, wherein it is made possible to securely and rigidly clamp the plate glass regardless of its thickness and without variation in the width of the clamps. Heretofore in such structures, when the clamping screw is drawn tightly, the clips of the clamp would stand out from the back face of the glass so as not to be in contact therewith, wherefore it was necessary that a special form of mirror clip be made according to the thickness of the glass upon which it was used. It was found desirable in practice, to employ a different sized clip for every thirty-second variation in the thickness of the glass. Other structures required the provision of special screws or clamps mounted in the plate adapted to bear against the back side of the mirror for holding the plate glass tightly against the clips. Such structures and the difficulties and expense attached thereto have been overcome by reason of the arrangement of the clip and clamping plate which will hereinafter be set forth and described.

The full nature of the invention will be understood from the accompanying drawings and the following description and claims.

Fig. 1 is an end elevation of the rear view mirror. Fig. 2 is a rear elevation thereof. Fig. 3 is a top plan view. Fig. 4 is an enlarged view showing the position of one of the clamping plates when drawn in clamping position.

In the drawings there is shown a rear view mirror 10 comprising the usual glass plate with a silvered surface. The glass plate is secured to a vehicle or similar structure by means of a bracket comprising the clamping plates 11 and 12. Said plates are each provided with the clips 13 and 14 respectively adapted to engage the edge of the glass plate 10 and rigidly clamping it to the bracket. Said plates 11 and 12 are provided with rearwardly extending ears 15 and 16 respectively for receiving the clamping screw 17 provided with the nut 18. The bracket 12 is also provided with rearwardly projecting ears 19 between which a universal mounting block 20 is pivotally secured by the bolt 21. This permits of the lateral adjustment of the mirror about an axis through said bolt by reason of the pivotal connection between the ears and the universal mounting block. For securing vertical adjustment, a U-shaped member 22 is pivotally connected to the lateral sides of the block 20 by the bolt 23 extending laterally therethrough or at right angles and adjacent the bolt 21. This permits of vertical adjustment about an axis through said bolt 23. For connecting the member 22 to the vehicle or other support, there is provided a clamping bolt 24 extending rearwardly therefrom.

As illustrated, and particularly shown in Fig. 4, the clips 13 and 14 are slightly greater in size and form than is necessary to embrace a glass plate or mirror of extreme thickness. This permits of even greater play or looseness with respect to the plate of lesser thickness. By reason of the screw 17 clamping the rearwardly projecting ears 15 and 16 together, their respective plates are caused to bear against the rear surface of the mirror at the fulcrum points, wherein this has the effect of drawing the clips rearwardly and downwardly so that the front face of the clip bears against the front edge of the plate as at B and the horizontal portion of the clip bears against the rear edge of the glass at C. Thus each clamping plate will bear against the glass at three different points. As regards the upper plate, there will be rear pressure at B as against the forward pressure at A, and a downward pressure at C. The same is true of the lower plate.

It will be observed from the foregoing that by reason of this structure the clips for embracing and clamping the edges of the glass need not be made to size, a single size clip being suitable for all and varying thicknesses of glass plate or mirror. Furthermore the necessity of providing a rear surface bearing clamp as commonly employed heretofore is eliminated, while the effect of such an additional clamp or bearing member is obtained through the fulcrum-like engagement of the plates adjacent the rearwardly extending ears 15 and 16. In addition to the above, a clamp having a plurality of contact points is obtained and the clamping effect is further augmented through the medium of the fulcrumed leverage and spring tension obtained in drawing the ears 15 and 16 together.

The invention claimed is:

1. In a rear view mirror, the combination with a mirror and a supporting bracket therefor, of a pair of clamping plates, U-shaped clips formed on the opposite ends of said plates having a downwardly protruding lip for engaging over the front edge thereof and spaced from the relatively long shank portion of the plate at a greater distance than the width of the mirror, the intermediate portion of the U-shaped clip engaging the rear edge of the mirror, whereby the relatively long shank portion of the plate will extend inwardly at an angle to the rear surface thereof, rearwardly extending ears bent outwardly from the opposite end of the shank portion of said plate from the U-shaped portion, and a bolt extending through and drawing said ears together at a distance from the point of contact with the rear surface of the mirror for causing said plates to bear against said surface as a fulcrum at said point of contact and impart oppositely directed forces to said U-shaped clips whereby the mirror will be clamped between said clips and the fulcrum points of said plates intermediate its edges.

2. In a rear view mirror, the combination with a mirror supporting bracket therefor, of a pair of clamping plates, said plates having a relatively long shank portion, a clamping ear bent from one end of the shank portion in one direction and a U-shaped clip bent from the other end of the shank portion in the opposite direction and provided with a downwardly extending lip, said lip being spaced from the shank portion at a greater distance than the thickness of the mirror whereby upon the positioning of the plate the U-shaped clip will embrace the edge of the mirror with the lip portion thereof engaging the front edge, the intermediate portion of the U-shaped clip engaging the rear edge, and the rearwardly bent ear at the opposite end of the shank portion engaging the rear surface of the mirror intermediate the edges, said shank portion extending at an angle to the plane of the mirror, and a bolt extending through said ears for drawing them together so as to cause the plate to fulcrum at its point of contact intermediate the edges of the mirror, whereby a pressure will be exerted against the rear surface of the mirror in one direction and against the forward edges of the mirror in the opposite direction, substantially as shown and described.

In witness whereof, I have hereunto affixed my signature.

BERT F. KELLY.